July 21, 1953     J. H. VOSS     2,645,993
PORTABLE COLLAPSIBLE SMOKE APPARATUS
Filed July 19, 1951     2 Sheets-Sheet 1
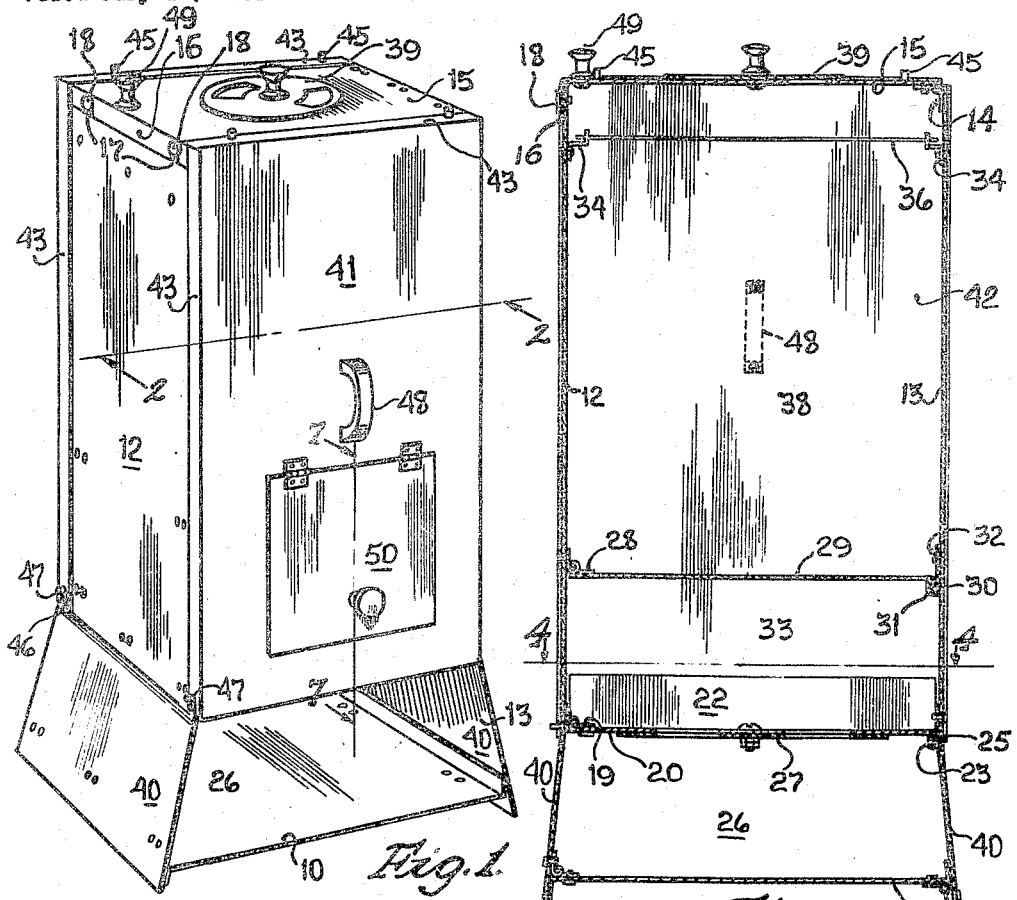
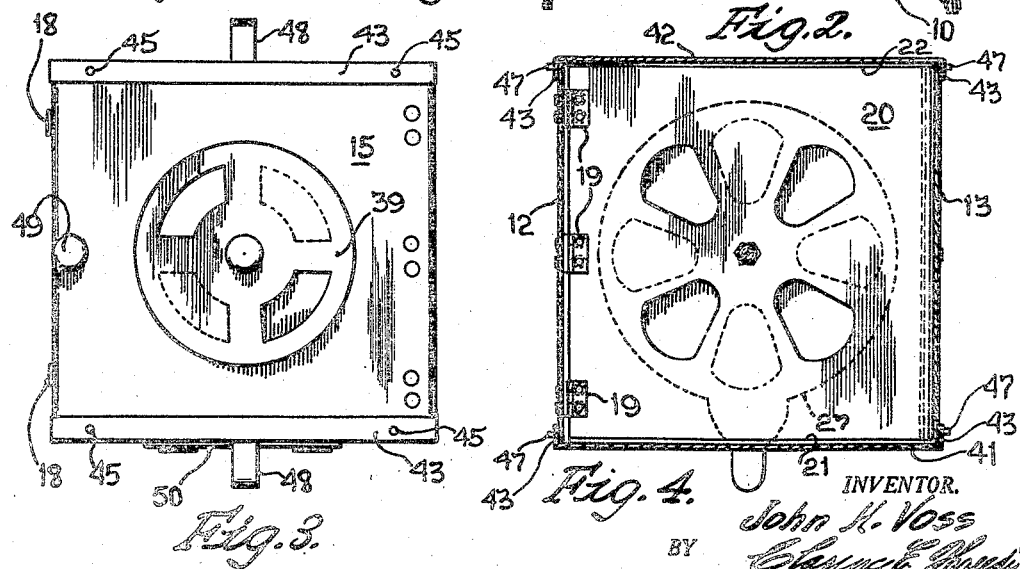
INVENTOR.
John H. Voss

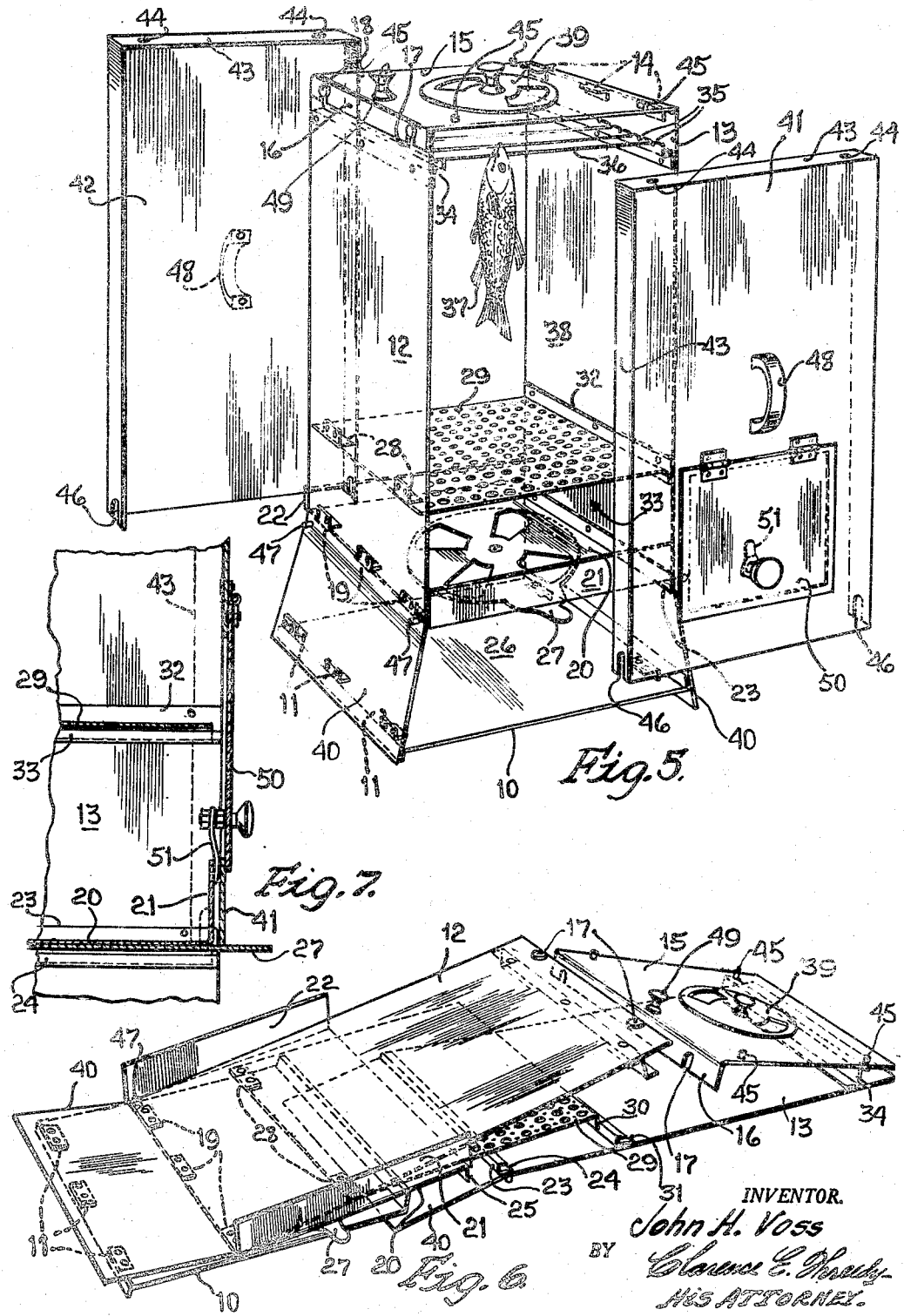

Patented July 21, 1953

2,645,993

UNITED STATES PATENT OFFICE 2,645,993

PORTABLE COLLAPSIBLE SMOKE APPARATUS

John H. Voss, Chicago, Ill.

Application July 19, 1951, Serial No. 237,577

2 Claims. (Cl. 99—259)

1

My invention relates to a portable collapsible smoke apparatus for smoking fish and other articles of food.

My invention is especially useful to fishermen and hunters who are desirous of smoking their catch while on a fishing or hunting trip.

One of the principal objects of this invention is to provide a portable smoke apparatus which, by reason of its construction, may be collapsed to a small compact condition, affording carrying the apparatus about while in such collapsed condition.

Another object of this invention is to provide a portable collapsible smoke apparatus which may be constructed at an economical cost and which may be highly efficient in use.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a perspective view of the invention;

Fig. 2 is a sectional detail view taken substantially on line 2—2 of Fig. 1;

Fig. 3 is a top plan view of the same;

Fig. 4 is a sectional detail view taken substantially on line 4—4 of Fig. 2;

Fig. 5 is a perspective view similar to Fig. 1, but showing the front and rear walls in exploded relation with respect to the side walls;

Fig. 6 is a perspective view illustrating the side, bottom, and top walls in collapsed position; and Fig. 7 is a fragmentary sectional detail view taken substantially on line 7—7 of Fig. 1.

My improved portable collapsible smoke apparatus comprises a bottom wall 10. Hinged to opposite corresponding edge portions of this bottom wall 10 by suitable hinges 11 are side walls 12 and 13. The side wall 13 at its upper end portion is hinged as at 14 to a top wall 15. This top wall 15 has a flange 16 which overlaps the upper edge portion of the side wall 12. This flange 16 has open notches 17 formed therein for the reception of head-bearing pins 18, by means of which the top wall 15 is attached to the side wall 12.

Hinged as at 19 to the side wall 12 is an edge portion of a burner plate 20 having upturned flanges 21 and 22.

A supporting bar 23 is attached to the side wall 13 and provides a channel 24 which receives the depending flange 25 of the burner plate 20. The

2 burner plate 20 is spaced from the bottom wall 10 to provide therebetween an ash chamber 26.

A draft regulator 27 of any approved construction is carried by the burner plate 20.

Hinged as at 28 to the side wall 12 above and in spaced relation to the burner plate 20 is a perforated plate 29. This perforated plate 29 has a depending flange 30 similar to the flange 25 and engaging in a channel 31 similar to the channel 24 and provided by a bar 32 carried by the side wall 13. This perforated plate 29 is spaced above the burner plate 20 and provides therebetween a fire chamber 33.

Adjacent the top edges of the side walls 12 and 13 are parallelly extending confronting bars 34 having formed in their top edges notches 35 to receive the end portion of supporting rods 36 from which is suspended the article of food 37 to be smoked within the smoke chamber 38 provided between the top wall 15 and the perforated plate 29. The perforations of the plate 29 are of sufficient diameter to permit smoke from the firebox to enter the smoke chamber 38, while at the same time preventing the flame from striking the articles being smoked. This plate 29 also prevents the articles of food from falling into the fire should they drop from the supporting rods 36. The top wall 15 is provided with a draft regulator 39.

As shown, the lower end portions 40 of the side walls are flared outwardly. By flaring the lower end portions of these side walls outwardly, the apparatus is provided with a stable base and cannot be easily overturned.

The apparatus further comprises a front wall 41 and a rear wall 42 each having flanges 43 which overlap the side and top walls 12, 13 and 15. The top flange 43 of the front and rear walls 41 and 42 is provided with perforations 44 through which pins 45 project to attach the front and rear walls 41 and 42 to the top wall 15. The lower edge portion of each of the side flanges 43 has formed therein open notches 46 for the reception of pins 47 carried by the side walls, thereby to complete a detachable connection between the front and rear walls and the side and top walls.

Suitable handles 48 are attached to the front and side walls to permit ready removal and mounting of these walls with respect to the side walls. The top wall 15 likewise has a finger button 49 which facilitates removal and mounting of this wall with respect to the side wall 12.

To complete the invention, I provide in the front wall 41 a door 50 located opposite the burner chamber 33. This door 50 is provided with a latch arm 51 adapted to be disposed between the flange 21 and the adjacent portion of the door 50.

In use, the article of food to be smoked, which in the present instance is illustrated as a fish, is suspended within the smoke chamber 38 from the rods 36. A suitable fire is made in the fire chamber, and for this purpose there may be utilized hickory, maple, or cherry shavings, or the like. The amount of draft through the smoke chamber may be regulated by the draft regulators 27 and 39.

By removing the front wall 41 and rear wall 42 the device may be used as a grill for food, by placing the same on the perforated plate 29 above the burner chamber 33.

The apparatus when collapsed provides a relatively small parcel which may be easily and conveniently packed away or carried about without any undue exertion on the part of the user.

As is evident, the portable collapsible smoke apparatus may be manufactured at an economical cost.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A portable collapsible smoke apparatus for smoking fish or the like comprising a housing having a bottom wall, side walls hinged to the opposite corresponding edges of the bottom wall, a top wall hinged to a top edge of one of the side walls and having a flange overlapping the top edge portion of the other side wall, said flange having receiving slots formed in its peripheral edge adapted to receive head pins carried by said side walls for detachably connecting said flange to said top edge portion of said side walls, a burner plate having one edge hinged to the said other side wall and located above the bottom wall to provide with the bottom wall an ash chamber, means detachably connecting the opposite edge of said burner plate to said one side wall, a perforated plate having an edge hinged to said other side wall and located above and in spaced relation to the burner plate and providing together therewith and with the side walls a burner chamber, said perforated plate being spaced from the top wall to provide therewith and with the side walls a smoke chamber, means for detachably connecting the opposite edge of the perforated plate to said one side wall, means adjacent the top edge portions of said side walls for supporting an article of food within said smoke chamber, a front wall having flanges overlapping the side and top walls, a rear wall having flanges overlapping the side and top walls, and means for detachably connecting the front and rear walls independently to the top and side walls respectively, said front wall having a hinged door opposite said burner chamber.

2. A portable collapsible smoke apparatus for smoking fish or the like comprising a housing having a bottom wall, side walls hinged to the opposite corresponding edges of the bottom wall, a top wall hinged to a top edge of one of the side walls and having a flange overlapping the top edge portion of the other side wall, said flange having receiving slots formed in its peripheral edge adapted to receive head pins carried by said side walls for detachably connecting said flange to said top edge portion of said side walls, a burner plate having one edge hinged to the said other side wall and located above the bottom wall to provide with the bottom wall an ash chamber, means detachably connecting the opposite edge of said burner plate to said one side wall, a perforated plate having an edge hinged to said other side wall and located above and in spaced relation to the burner plate and providing together therewith and with the side walls a burner chamber, said perforated plate being spaced from the top wall to provide therewith and with the side walls a smoke chamber, means for detachably connecting the opposite edge of the perforated plate to said one side wall, means adjacent the top edge portions of said side walls for supporting an article of food within said smoke chamber, a front walll having flanges overlapping the side and top walls, a rear wall having flanges overlapping the side and top walls, and means for detachably connecting the front and rear walls independently to the top and side walls respectively, said front wall having a hinged door opposite said burner chamber, said top wall and said burner plate each having a draft regulator, and said bottom wall being disposed above the lower edge portions of the side walls.

JOHN H. VOSS.

References Cited in the file of this patent

UNITED STATES PATENTS

| Number | Name | Date |
|---|---|---|
| 1,187,009 | Pickup | June 13, 1916 |
| 1,328,183 | Mlekush | Jan. 13, 1920 |
| 2,424,665 | Pope | July 29, 1947 |

FOREIGN PATENTS

| Number | Country | Date |
|---|---|---|
| 333,303 | France | Sept. 17, 1903 |